United States Patent
Wirola et al.

(10) Patent No.: US 11,388,572 B2
(45) Date of Patent: Jul. 12, 2022

(54) CONFIGURATION OF A COMMUNICATION CONNECTION

(71) Applicant: HERE Global B.V., Eindhoven (NL)

(72) Inventors: Lauri Aarne Johannes Wirola, Tampere (FI); Jari Tapani Syrjärinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 98 days.

(21) Appl. No.: 16/647,351

(22) PCT Filed: Sep. 15, 2017

(86) PCT No.: PCT/EP2017/073260
§ 371 (c)(1),
(2) Date: Mar. 13, 2020

(87) PCT Pub. No.: WO2019/052652
PCT Pub. Date: Mar. 21, 2019

(65) Prior Publication Data
US 2021/0037365 A1    Feb. 4, 2021

(51) Int. Cl.
*H04W 4/80* (2018.01)
*H04W 4/02* (2018.01)
(Continued)

(52) U.S. Cl.
CPC .............. *H04W 4/80* (2018.02); *H04W 4/02* (2013.01); *H04W 28/18* (2013.01);
(Continued)

(58) Field of Classification Search
CPC ......... H04W 4/80; H04W 4/02; H04W 28/18; H04W 52/0229; H04W 52/367; H04W 52/54; Y02D 30/70
See application file for complete search history.

(56) References Cited

U.S. PATENT DOCUMENTS 8,189,618 B2    5/2012  Dhanapal et al.
9,198,137 B2   11/2015  Koskela et al.
(Continued)

FOREIGN PATENT DOCUMENTS

EP    2 963 953 A1    1/2016
EP    3 089 484 A1   11/2016
WO   WO 2019/052653 A1    3/2019

OTHER PUBLICATIONS

Office Action issued for European Application No. 17780021.6 dated Jan. 20, 2021 (8 pages).
(Continued)

*Primary Examiner* — Walli Z Butt
*Assistant Examiner* — Shawn D Miller
(74) *Attorney, Agent, or Firm* — Alston & Bird LLP

(57) ABSTRACT

A method is disclosed comprising: determining a discrete value based on one or more transmission parameters, whereineach of the one or more transmission parameters is indicative of a respective attribute with respect to a communication of a radio node transmitting identifier information in a venue, wherein the discrete value is indicative of a value from a finite number of values, and wherein the identifier information is indicative of information allowing the radio node to be identified. It is further disclosed an according apparatus, computer program and system.

19 Claims, 6 Drawing Sheets

(51) Int. Cl.
*H04W 28/18* (2009.01)
*H04W 52/02* (2009.01)
*H04W 52/36* (2009.01)
*H04W 52/54* (2009.01)

(52) U.S. Cl.
CPC ..... *H04W 52/0229* (2013.01); *H04W 52/367* (2013.01); *H04W 52/54* (2013.01)

(56) References Cited

U.S. PATENT DOCUMENTS

| | | | |
|---|---|---|---|
| 9,398,422 | B2 | 7/2016 | Zampini, II |
| 2007/0160026 | A1 | 7/2007 | Gupta et al. |
| 2012/0157116 | A1 | 6/2012 | Karlsson et al. |
| 2015/0095195 | A1* | 4/2015 | Want ............... G06F 16/4387 705/26.62 |
| 2015/0304824 | A1 | 10/2015 | Syrjarinne et al. |
| 2016/0161592 | A1 | 6/2016 | Wirola et al. |
| 2017/0078003 | A1* | 3/2017 | Ghosh ............... H04W 74/04 |
| 2018/0167775 | A1* | 6/2018 | Tian ............... H04W 64/003 |
| 2018/0188380 | A1* | 7/2018 | Venkatraman ........ G01S 19/396 |
| 2018/0293871 | A1* | 10/2018 | Malinofsky ............. H04W 4/80 |

OTHER PUBLICATIONS

International Search Report and Written Opinion for PCT/EP2017/073260 dated May 16, 2018, 13 pages.

Eddystone—A Google Beacon Profile [online] [retrieved Apr. 5, 2017]. Retrieved from the Internet: https://iosandi.blogspot.in/2015/12/in-addition-to-my-previous-post-i-have.html (Dec. 16, 2015) 4 pages.

Eddystone—UID [online] [retrieved Apr. 5, 2017]. Retrieved from the Internet: https://github.com/google/eddystone/tree/master/eddystone-uid (2017) 2 pages.

U.S. Appl. No. 16/647,101, filed Mar. 13, 2020; In re: Wirola et al., entitled *Determining Radio Node Identifiers*.

Office Action for European Application No. 17780021.6 dated Jan. 28, 2022, 5 pages.

* cited by examiner

CONFIGURATION OF A COMMUNICATION CONNECTION

CROSS-REFERENCE TO RELATED APPLICATIONS

This application is a national phase entry of International Application No. PCT/EP2017/073260, filed Sep. 15, 2017, the entire contents of which are incorporated herein by reference.

FIELD

The following disclosure relates to the field of indoor positioning, or more particularly relates to systems, apparatuses, and methods for configuring a communication between devices of indoor positioning systems.

BACKGROUND

Indoor positioning requires novel systems and solutions that are specifically developed and deployed for this purpose. The "traditional" positioning technologies, which are mainly used outdoors, for instance satellite and cellular positioning technologies, cannot deliver such performance indoors that would enable seamless and equal navigation experience in both environments.

The required positioning accuracy (within 2 to 3 meters), coverage (~100%) and floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years, for instance solutions based on pseudolites (Global Positioning System (GPS)-like short-range beacons), ultrasound positioning, Bluetooth Low Energy (BLE) signals (e.g. High-Accuracy Indoor Positioning, HAIP) and Wi-Fi fingerprinting. What is typical to these solutions is that they require either deployment of totally new infrastructure (radio nodes or radio beacons, or tags to name but a few non-limiting examples) or manual exhaustive radio surveying of the buildings including all the floors, spaces and rooms. This is rather expensive and will take a considerable number of time to build the coverage to the commercially expected level, which in some cases narrowed the potential market segment only to very thin customer base, for instance for health care or dedicated enterprise solutions. Also, the diversity of these technologies makes it difficult to build a globally scalable indoor positioning solution, and the integration and testing will become complex if a large number of technologies needs to be supported in the consumer devices (e.g. smartphones).

For an indoor positioning solution to be commercially successful, that is, i) being globally scalable, ii) having low maintenance and deployment costs, and iii) offering acceptable end-user experience, the solution needs to be based on an existing infrastructure in the buildings and on existing capabilities in the consumer devices. This leads to an evident conclusion that the indoor positioning needs to be based on Wi-Fi- and/or Bluetooth (BT)-technologies that are already supported in every smartphone, tablet, laptop and even in the majority of feature phones. It is, thus, required to find a solution that uses the Wi-Fi- and BT-radio signals in such a way that makes it possible to achieve 2 to 3 meter horizontal positioning accuracy, close to 100% floor detection with the ability to quickly build the global coverage for this approach.

Further, a novel approach for radio-based indoor positioning that models for instance the Wi-Fi-radio environment (or any similar radio e.g. Bluetooth) from observed Received Signal Strength (RSS)-measurements as two-dimensional radio maps and is hereby able to capture the dynamics of the indoor radio propagation environment in a compressable and highly accurate way. This makes it possible to achieve unprecedented horizontal positioning accuracy with the Wi-Fi signals only within the coverage of the created radio maps and also gives highly reliable floor detection.

To setup indoor positioning in a building, the radio environment in the building needs to be surveyed. This phase is called radiomapping. In the radiomapping phase samples containing geolocation (like latitude, longitude, altitude; or x, y, floor) and radio measurements (Wi-Fi and/or Bluetooth radio node identities and signal strengths). Having these samples allows understanding how the radio signals behave in the building. This understanding is called a radio map. The radio map enables localization capability to devices. When they observe varying radio signals, the signals can be compared to the radio map resulting in the location information.

The radio samples for the radio map may be collected with special software tools or crowd-sourced from the user devices. While automated crowd-sourcing can enable indoor localization in large number of buildings, manual data collection using special software tools may be the best option, when the highest accuracy is desired.

SUMMARY

Yet another aspect of the modern Bluetooth radio node respectively beacon systems is beacon monitoring and management. The key aspect of these systems may be as follows:

Hubs are deployed throughout the venue so that each beacon can communicate with at least one hub. The hubs, on the other hand, are connected to a monitoring/management server via a gateway hub, which is essentially a wired/wireless router. The hubs may be connected to the gateway hub through cable (e.g. Ethernet) or wirelessly (e.g. Wi-Fi, Cellular). Additionally or alternatively, a plurality of radio nodes (e.g. beacons) may for instance form a mesh communication network. In such a case, it is possible that only a single gateway hub is required. Further, the radio nodes may be connected to the single gateway hub, e.g. wirelessly (e.g. Wi-Fi, Cellular). The radio nodes forming the mesh communication network may communicate (e.g. transmit information) with each other. The gateway hub connected to the radio nodes forming the mesh communication network is further connected to a monitoring/management server.

The beacon monitoring refers to monitoring the beacon characteristics most typically via one-way communications by the hubs. The beacons may e.g. periodically broadcast their battery states, which transmissions are captured by the hubs and further routed to the monitoring/management server for analysis and visualization. The beacon management, on the other hand, refers to being able to perform two-way communication with the hubs and beacons. With a beacon management system e.g. the beacon transmit power can be re-configured remotely or the advertisement message changed, when needed. The server managing/monitoring the hub and/or beacon constellations can be a virtual server operated in a cloud (e.g. AWS, Azure), or it can be also a physical local server constituting a self-hosted, high-security system.

It is thus, inter alia, an object of the invention to achieve a solution for being able to configure devices communicating in indoor positioning systems without requiring additional hardware or to change existing hardware, e.g. of the radio node, being able to communicate with the radio node.

According to a first exemplary aspect of the present invention, a method is disclosed, the method, performed by at least one first apparatus, comprising:

determining a discrete value based on one or more transmission parameters, wherein each of the one or more transmission parameters is indicative of a respective attribute with respect to a communication of a radio node transmitting identifier information in a venue, wherein the discrete value is indicative of a value from a finite number of values, and wherein the identifier information is indicative of information allowing the radio node to be identified.

This method may for instance be performed and/or controlled by a server or a hub. For instance, the method may be performed and/or controlled by using at least one processor of the server or the hub.

According to a second exemplary aspect of the present invention, a method is disclosed, the method, performed by at least one second apparatus, comprising:

obtaining identifier information indicative of information allowing a radio node of a venue to be identified;

determining a discrete value based on the obtained identifier information, wherein the discrete value is indicative of a value from a finite number of values;

determining one or more transmission parameters based on the determined discrete value, wherein each of the one or more transmission parameters is indicative of a respective attribute with respect to a communication of the radio node transmitting the identifier information in the venue; and configuring the at least one second apparatus based on the determined one or more transmission parameters.

This method may for instance be performed and/or controlled by an electronic device, e.g. a mobile device (e.g. terminal, smartphone, tablet, or portable navigation device to name but a few non-limiting examples). For instance, the method may be performed and/or controlled by using at least one processor of the electronic device.

According to a third exemplary aspect of the present invention, a method is disclosed, the method, performed by at least one third apparatus, comprising:

transmitting identifier information indicative of information allowing a radio node of a venue to be identified, wherein the identifier information comprises a discrete value inserted into the identifier information, wherein the discrete value is indicative of a value from a finite number of values, wherein the discrete value is determined based on one or more transmission parameters, wherein each of the one or more transmission parameters is indicative of a respective attribute with respect to a communication of the radio node in the venue; and wherein the identifier information is transmitted according to the one or more transmission parameters.

This method may for instance be performed and/or controlled by a radio node. For instance, the method may be performed and/or controlled by using at least one processor of the radio node.

According to a further exemplary aspect of the invention, a computer program is disclosed, the computer program when executed by a processor causing an apparatus, for instance a server, to perform and/or control the actions of the method according to the first and/or second and/or third exemplary aspect of the present invention.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first and/or second and/or third exemplary aspect of the present invention.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first and/or second and/or third exemplary aspect of the present invention.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising:

at least one first apparatus according to any aspect of the invention as disclosed above, at least one second apparatus according to any aspect as disclosed above, and at least one third apparatus according to any aspect as disclosed above, wherein the second apparatus is configured to obtain identifier information, e.g. from the third apparatus.

In the following, exemplary features and exemplary embodiments of all aspects of the present invention will be described in further detail.

Each radio node of the venue may for instance be comprised by the venue, e.g. by an infrastructure of the venue. A radio node of the venue may for instance be a beacon used for indoor positioning and/or floor detection, e.g. according to BT—(Bluetooth) and/or BLE—(Bluetooth Low Energy) specification, or may for instance be a Wi-Fi Access Point for indoor positioning and/or floor detection, e.g. according to the WLAN—(Wireless Local Area Network) specification). Indoor positioning and/or floor detection may for instance be performed and/or controlled based on a radio map. Each radio node of the venue may for instance comprise or be connectable to a transceiver, e.g. according to the BT-, BLE, and/or WLAN-specification to provide wireless-based communication. Each radio node of the venue may for instance use such a transceiver for transmitting and/or broadcasting one or more signals, e.g. comprising one or more information.

The radio node of the venue may for instance be one of the at least two devices taking part in a communication in the venue. The other device of the at least two devices taking part in such a communication in the venue may for instance be an electronic device. The electronic device may for instance comprise or be connectable to a transceiver, e.g. according to the BT-, BLE, and/or WLAN-specification to provide wireless-based communication. The electronic device may for instance use such a transceiver for obtaining (e.g. receiving) the plurality of fingerprints.

The venue may for instance be a building, shopping mall, office complex, public accessible location (e.g. station, airport, university or the like), to name but a few non-limiting examples.

Each of the one or more transmission parameters is indicative of a respective attribute with respect to a communication of a radio node transmitting identifier information in a venue. Thus, each of the one or more transmission parameters may for instance influence how the transmission of information may take place.

The one or more transmission parameters may for instance be represented by a set of transmission parameters. The set of transmission parameters may for instance comprise the one or more transmission parameters.

The one or more transmission parameters are obtained, e.g. by receiving the one or more transmission parameters. The one or more transmission parameters may for instance be received from an entity that monitors respectively manages one or more communications between e.g. one or more radio nodes and one or electronic devices in the venue. The entity that monitors respectively manages the one or more communications may for instance be a server (e.g. of the venue) having a communication connection (e.g. wirebound or wireless) to the at least two devices participating in a communication in the venue. The server may not be comprised by the venue. In this case, one or more entities of the venue may for instance establish a communication connection, e.g. via the internet, to such a server, which may for instance be accessible via a communication network (e.g. the internet).

At least one hub may for instance be deployed in the venue so that each radio node of the venue can communicate with the at least one hub.

In case the venue comprises more than one of such hubs and more than one radio nodes, the more than one radio nodes of the venue may for instance be deployed in the venue so that each radio node of the venue can communicate with the at least one hub.

The hub may for instance be able to communicate with the at least one first apparatus. The hub may for instance be able to communicate with an entity that manages respectively monitors one or more devices participating in a communication in the venue, e.g. via a wirebound or wireless communication connection. The one or more transmission parameters may for instance be determined by the hub or the server. After the determining of the one or more transmission parameters, the determined one or more transmission parameters may for instance be provided, e.g. output. The one or more transmission parameters may for instance be output to the at least one first apparatus, or to another entity (e.g. in the venue or in a cloud), which transmits the determined one or more transmission parameters to the at least one first apparatus.

The discrete value is indicative of a value from a finite number of values, e.g. for instance the determined discrete value may for instance be represented by a value determined based on a pre-defined (or determined according to pre-defined rules) number of values. The discrete value may for instance be or represent a code, e.g. a number or a letter or a combination thereof. The discrete value may for instance be represented in binary form by a pre-defined number of bits.

The number of values may for instance be set prior to performing and/or controlling the method according to the first and/or second and/or third exemplary aspect of the present invention. In this way, the number of values the discrete value may for instance be determined to represent is finite.

Additionally or alternatively, the determined discrete value is then output.

The determined discrete value may for instance be output by one or more broadcasts. By outputting the determined discrete value, the determined discrete value may for instance be transmitted to at least one other device.

According to an exemplary embodiment of all exemplary aspects of the present invention, the method further comprises:

inserting or causing insertion of the determined discrete value into the identifier information.

The determined discrete value is inserted into the identifier information by e.g. adding the determined discrete value to the identifier information. For instance, the discrete value may represent a code, which is then inserted or caused to be inserted into the identifier information. The code may then for instance be a part of the identifier information. Thus, the identifier information may for instance comprise the determined discrete value. For instance, at least a part of the identifier information represents the determined discrete value. Alternatively, the determined discrete value is inserted into the identifier information by e.g. assigning respectively overwriting a part (e.g. already comprising one or more value) of the identifier information with the determined discrete value.

In this way, e.g. a server managing respectively monitoring the at least two devices communicating in the venue may be able to provide one or more transmission parameters to a radio node and/or an electronic device without requiring additional hardware either on part of the electronic device or an part of the hub or the server.

A radio node may for instance be monitored by e.g. such a hub or such a server by a one-way communication, wherein the one-way communication may for instance be realized via a broadcast from a radio node to e.g. such a hub or such a server.

A two-way communication between a radio node of the venue and such a hub or such a server may for instance be needed e.g. for a management of the radio node. The two-way communication may for instance enable, e.g. such a hub or such a server, to re-configure the radio node of the venue or an electronic device communicating with such a radio node of the venue, e .g. setting or changing a transmission power parameter, or an advertisement message, or the like to name but a few non-limiting examples of the radio node.

Additionally or alternatively, the identifier information is then output.

The identifier information may for instance be output by one or more broadcasts. Thus, a communication connection from an entity providing the one or more transmission parameters (in the form of identifier information according to example aspects of the present invention; e.g. a radio node of the venue) can be realized. The communication connection to e.g. the radio node of the venue may for instance be a wirebound or wireless communication connection.

According to an exemplary embodiment of all exemplary aspects of the present invention, the one or more transmission parameters are associated with the discrete value so that based on the discrete value the one or more transmission parameters are determinable.

The discrete value may for instance be associated with one or more transmission parameters in a memory, e.g. a database. Such a database may for instance comprise a look-up table, wherein a plurality of discrete value may for instance be associated with one or more transmission parameters. For instance, corresponding to one or more transmission parameters, a discrete value may be associated with the one or more transmission parameters, wherein based on the discrete value, one or more transmission parameters may for instance be identifiable. Combinations of one or more transmission parameters may for instance be possible. For instance, one or more transmission parameters may for instance be chosen to be provided, e.g. to a radio node of the venue and/or an electronic device, wherein the discrete value may for instance be associated with the one or more transmission parameters. Then, the one or more transmission parameters may for instance be determined corresponding to the associations of the discrete value to the one or more transmission parameters e.g. in the look-up table stored in the memory.

According to an exemplary embodiment of all exemplary aspects of the present invention, one or more transmission parameters comprise one or more of the following parameters i) to iii):

i) a transmission power parameter;
ii) one or more transmission channel parameters; and
iii) a transmission interval parameter.

The transmission power parameter may for instance be indicative of a radio node transmission power. The transmission power parameter may for instance represent one or more different transmission powers, which may for instance be used for a communication link between, e.g. a radio node and an electronic device. In particular, a transmission power parameter may for instance be indicative of a transmission power, e.g. a value in the unit dBm. For instance, a transmission power parameter may represent one of e.g. six possible transmission power parameters (e.g. which may for instance be pre-defined according to e.g. requirements of an indoor positioning system of a venue). A transmission power parameter may for instance represent one of the following transmission powers 0 to 6:1) 0 dBm (1 mW transmission power); 2) 5 dBm (approx. 3.2 mW transmission power); 3) 10 dBm (10 mW transmission power); 4) 15 dBm (approx. 31.6 mW transmission power); 5) 20 dBm (100 mW transmission power); or 6) 30 dBm (1000 mW transmission power).

The one or more transmission channel parameters may for instance be indicative of one or more channels the radio node uses for communicating with another device, e.g. an electronic device. As a minimum, one channel may for instance be used. Further, more than one channel may for instance be used for communicating with another device. For instance, a transmission channel parameter may represent one of e.g. seven different combinations of possible transmission channels (e.g. which may for instance be pre-defined, as aforementioned corresponding to the transmission power parameter). For instance, it may be chosen between three different transmission channels, e.g. referred to as transmission channels 37, 38 and 39. Any combination between the three transmission channels may for instance be possible. Thus, a transmission parameter may for instance represent one of the following parameters 1 to 7, wherein the exemplary transmission channels 37, 38 and 39 are used in this non-limiting example: 1) transmission channel 37; 2) transmission channel 38; 3) transmission channel 39; 4) transmission channels 37 and 38; 5) transmission channels 37 and 39; 6) transmission channels 38 and 39; or 7) transmission channels 37, 38 and 39.

The transmission interval parameter may for instance be indicative of a transmission interval of the radio node, e.g. how often a radio node of the venue transmits e.g. an advertisement packet that notifies nearby devices (e.g. electronic devices) about the existence of the radio node and on which channel the radio node of the venue transmits). Based on the transmission interval parameter, e.g. an electronic device being involved in a communication with the radio node, may for instance activate (e.g. turn power on) means for transmitting and/or receiving (e.g. a transceiver) only if one or more signals being sent from the radio node can be received. This may for instance reduce the energy consumption of such an electronic device. The transmission interval parameter may for instance be indicative of a transmission interval, e.g. a value in the unit Hz. For instance a transmission interval parameter may represent one of e.g. six possible transmission interval parameters (e.g. which may for instance be pre-defined, as aforementioned corresponding to the transmission power parameter). A transmission interval parameter may for instance represent one of the following transmission intervals 0 to 6:1) 1 Hz transmission interval; 2) 2 Hz transmission interval; 3) 3 Hz transmission interval; 4) 4 Hz transmission interval; 5) 5 Hz transmission interval, or 6) 6 Hz transmission interval.

According to an exemplary embodiment of all exemplary aspects of the present invention, the discrete value is represented by one or more bits.

As mentioned above in this specification, the discrete value may for instance be represented by a code, e.g. a number or a letter or a combination thereof, to name but a few non-limiting examples. In particular, a set of one or more transmission parameters is represented by a discrete value, wherein the discrete value is represented by such a code. For instance, the discrete value may be represented by an integer value. The integer value may for instance be transformed into a binary value. Further, the discrete value may for instance be a hexadecimal value. The hexadecimal value may for instance be transformed into a binary value. Alternatively, the discrete value may for instance be represented by a binary value. It will be understood that the code, e.g. comprising or consisting of a letter, may for instance be transformed (e.g. converted) into a binary, or a hexadecimal value, or the like to name but a few non-limiting examples as well.

The discrete value may for instance be representing 16 different values, e.g. from 0 to F. Each value of the hexadecimal value bit may for instance represent one or more transmission parameters, or a combination of more than one transmission parameters, also referred to as a set of transmission parameters. For instance, in case the combination of more than one transmission parameters is represented by the discrete value, the combination of more than one transmission parameters may for instance comprise two or more parameters of parameters i) to iii), e.g. a transmission power parameter and a transmission interval parameters, or a transmission power parameter and a transmission channel parameter, or a transmission interval parameters and a transmission channel parameter, or a transmission power parameter and a transmission interval parameters and a transmission channel parameter.

The inserting of the discrete value may for instance be performed by using one or more bits of the identifier information to represent the discrete value. The one or more bits of the identifier information may for instance be placed at a pre-defined or determined according to pre-defined rules position of the identifier information.

According to an exemplary embodiment of all exemplary aspects of the present invention, at least a part of the identifier information comprises ownership information, wherein the ownership information is indicative of one or more radio nodes of a company or an owner of the one or more radio nodes of the venue, and at least another part of the identifier information comprises instance information, wherein the instance information is indicative of an identification of the radio node of the venue, which is a part of the one or more radio nodes corresponding to the ownership information.

Thus, the company or the owner may for instance be identified at first, wherein the company of the owner may for instance have more than one radio nodes (e.g. beacons). Then, within all radio nodes of the venue belonging to the company or the owner, a radio node may for instance be identified based on the instance information of the identifier information.

According to an exemplary embodiment of all exemplary aspects of the present invention, the instance information is divided into a plurality of upper bits and a plurality of lower bits, wherein the discrete value being represented by one or more bits is inserted into the plurality of lower bits.

The plurality of upper bits of the instance information may for instance comprise at least two bits. The plurality of lower bits of the instance information may for instance comprise at least two bits. The total length of the plurality of upper bits and/or the plurality of lower bits of the instance information may for instance be pre-defined or determined according to pre-defined rules. For instance, the total length of the plurality of lower bits of the identifier information of a beacon according to BLE communication standard (may be 4 or 8 bits, or 1, 2, 3, 4, 5, or 6 bytes). The total length of the plurality of lower bits of the identifier information may for instance be dependent on the protocol used for broadcasting the identifier information by the radio node.

The discrete value being represented by one or more bits is inserted into the plurality of lower bits of the identifier information. Alternatively, the discrete value being represented by one or more bits may for instance be comprised by the plurality of lower bits of the identifier information.

According to an exemplary embodiment of all exemplary aspects of the present invention, the one or more transmission parameters are not part of advertisement information of the radio node.

In contrast, the one or more transmission parameters are provided as a discrete value, or as discrete set of pre-defined values representing one or more transmission parameters, and may for instance be inserted into the identifier information that may then be transmitted (e.g. broadcasted) by the corresponding radio node of the venue.

The at least one first apparatus may for instance be a server and/or a hub connected to a radio node of the venue, which may for instance be configured according to the determined one or more transmission parameters.

The at least one second apparatus may for instance be an electronic device. The electronic device may for instance be portable (e.g. a smartphone, tablet, portable navigation device, to name but a few non-limiting examples).

The at least one third apparatus may for instance be a radio node of the venue. The radio node may for instance be a beacon.

According to an exemplary embodiment of the third exemplary aspect of the present invention, the discrete value is obtained prior to the transmitting of the identifier information.

The discrete value may for instance be obtained by receiving the discrete value, e.g. from a server or a hub that are connected to the radio node (e.g. via a wirebound or wireless communication connection).

In this case, the discrete value may for instance be inserted into the identifier information by the radio node. Then, the identifier information comprising the inserted discrete value can be transmitted by the radio node.

According to an exemplary embodiment of the third exemplary aspect of the present invention, the identifier information comprising the discrete value is obtained prior to the transmitting of the identifier information.

The identifier information comprising the discrete value may for instance be obtained by receiving the discrete value, e.g. from a server or a hub that are connected to the radio node (e.g. via a wirebound or wireless communication connection).

Since the discrete value is comprised by the obtained identifier information, there is no need to insert the discrete value into the identifier information by the radio node. The obtained identifier information can be transmitted by the radio node.

The identifier information may for instance be obtained by receiving the identifier information, e.g. from a server or a hub in case of the radio node of the venue, or from a radio node of the venue in case of an electronic device obtaining the identifier information. The identifier information may for instance be provided to the electronic device by one or more signals, which are sent (e.g. via one or more broadcasts) by the radio node of the venue. Additionally or alternatively, the identifier information may for instance be provided to the radio node of the venue by one or more signals, which are sent, e.g. by the server of the hub.

In case one or more electronic devices obtains (e.g. receive) the identifier information, each electronic device of the one or more electronic devices may for instance derive one or more transmission parameters from the identifier information via a discrete value comprised by the identifier information.

At the radio node of the venue and/or at the electronic device, the (received) identifier information is e.g. processed to determine one or more transmission parameters, wherein the one or more transmission parameters may for instance be used to configure the radio node of the venue and/or the electronic device.

For instance, the discrete value is determined based on the obtained identifier information, which may for instance comprise the discrete value. For instance, a part of the identifier information may for instance comprise the discrete value. For instance, the second apparatus may know where the discrete value is located within the identifier information in order to determine the discrete value.

The discrete value may for instance be associated with one or more transmission parameters. The one or more transmission parameters may for instance be determined by accessing a look-up table. The look-up table may for instance be stored in a memory, e.g. a database. The look-up table may for instance comprise a plurality of discrete values, wherein the plurality of discrete values may for instance be associated with one or more transmission parameters. For instance, corresponding to the determined discrete value, one or more transmission parameters may for instance be associated with the discrete value in the look-up table. Based on the discrete value, one or more transmission parameters may for instance be identifiable.

The at least one second apparatus is configured according to the determined one or more transmission parameters.

In this way, backwards compatibility may for instance be achieved corresponding to the method according to the first exemplary aspect of the present invention. The method according to the second exemplary aspect of the present invention handles an outputted identifier information to acquire one or more transmission parameters in order to enhance the efficiency of the communication between the second apparatus performing the method according to the second exemplary aspect of the present invention and the apparatus performing the method according to the first exemplary aspect of the present invention.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description as provided in the above summary section of this specification.

Figure 1:
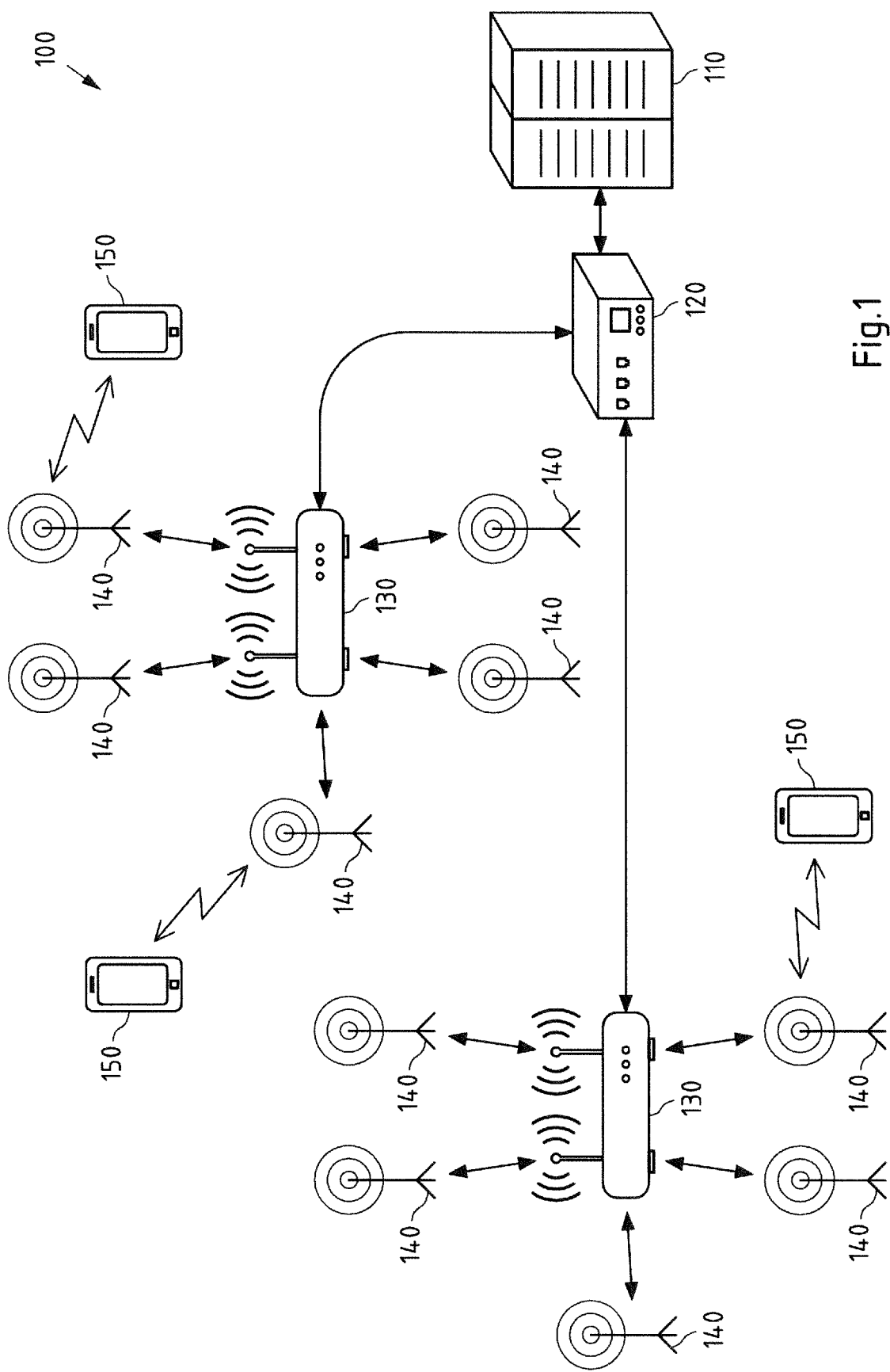
FIG. 1 a schematic block diagram of a system according to an exemplary aspect of the present invention.

FIG. 1 is a schematic high-level block diagram of a system 100 according to an exemplary aspect of the present invention. System 100 comprises a server 110, a gateway hub 120, one or more hubs 130, one or more radio nodes 140, at hand embodied as beacons, and one or more electronic devices 150, at hand embodied as mobile devices, e.g. a smartphone, tablet, portable navigation device, IoT (Internet of Things) device to name but a few non-limiting examples. One or more of the aforementioned entities of the system 100 may for instance be comprised (e.g. installed and/or located) in a venue.

The server 110 may alternatively be embodied as a server cloud (e.g. a plurality of servers connected, e.g. via the Internet and providing services at least partially jointly). Further, the one or more radio nodes 140 may for instance be embodied as one or more IoT devices. The gateway hub 120 and/or the hubs 130 may for instance be optional. In this case, the server 110 may be connected to the one or more radio nodes (e.g. beacons) e.g. via the internet or via a wirebound or wireless communication connection (e.g. according to the Wi-Fi, BT, and/or BLE communication standard). Alternatively, the radio nodes 140 may for instance form a mesh communication network. In such a case, it is possible that only a single gateway hub 120 is comprised by the system 100. Further, the radio nodes 140 may be connected to the single gateway hub 120, e.g. wirelessly (e.g. Wi-Fi, Cellular). The radio nodes 140 forming the mesh communication network may communicate (e.g. transmit information) with each other. The gateway hub 120 connected to the radio nodes 140 forming the mesh communication network is further connected to the server 110, which may for instance be embodied as a monitoring respectively management server for the radio nodes 140.

Alternatively, the server 110 may for instance be optional. In this case, at least one of the hubs may for instance provide the functionalities and/or services, which the server provides in the other alternative embodiment, e.g. to the one or more radio nodes 140.

According to embodiments of the present invention, the server 110 may for instance monitor and/or manage the one or more radio nodes 140 of the venue. The server 110 may for instance obtain one or more transmission parameters. Alternatively, the one or more transmission parameters may for instance be obtained from the server 110, e.g. via the gateway hub 120, by the hubs 130. The one or more hubs 130 are connected to the gateway hub 120, e.g. via a communication connection (e.g. wirebound or wireless).

The server 110 may for instance determine a discrete value based on the one or more transmission parameters and insert the determined discrete value into identifier information, which is then outputted to one of the one or more radio nodes 140 of the venue. Each radio node 140 of the one or more radio nodes 140 of the venue may for instance broadcast its identifier information, which was provided to each radio node 140 of the one or more radio nodes 140, e.g. via at least one of the one or more hubs 130.

The broadcasted identifier information may for instance be obtained (e.g. received) by the one or more electronic devices 150. The one or more electronic devices 150 may for instance determine a discrete value based on at least one of the obtained identifier information (e.g. in case the identifier information is obtained from more than one radio nodes 140). The one or more electronic devices 150 may for instance determine one or more transmission parameters based on the determined discrete value, wherein the one or more transmission parameters are indicative of one or more attributes with respect to a communication between the electronic device 150 of the one or more electronic devices 150 and the radio node 140 of the one or more radio nodes 140, from which radio node 140 the electronic device 150 may have obtained the identifier information.

Figure 2:
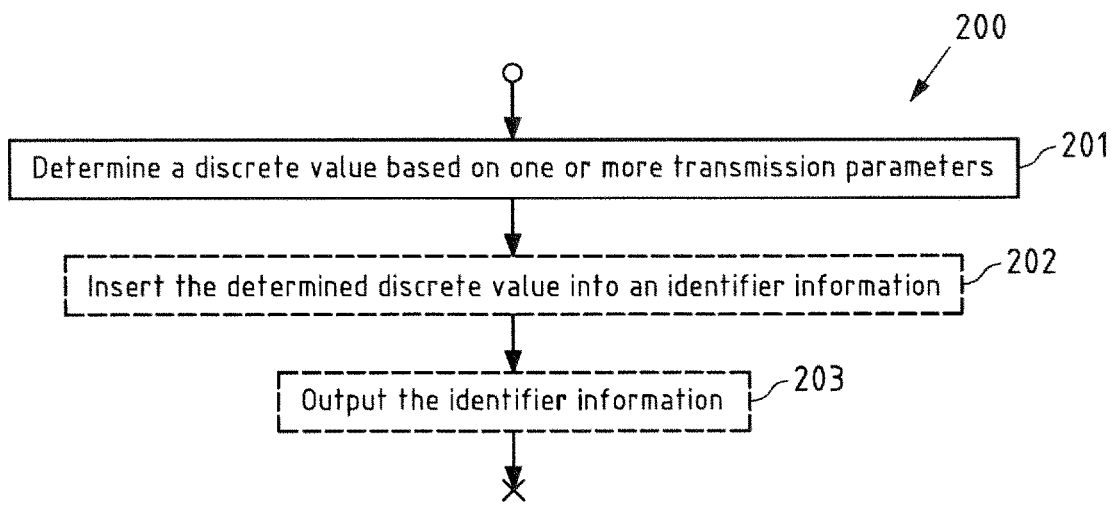
FIG. 2 a flowchart showing an example embodiment of a method according to the first exemplary aspect of the present invention, for instance performed by server 110 or a hub 130 of FIG. 1.

FIG. 2 is a flowchart 200 showing an example embodiment of a first method according to the first exemplary aspect of the present invention. This flowchart 200 may for instance be performed by a hub (e.g. one of the hubs 140 of FIG. 1) or a server (e.g. server 110 of FIG. 1).

In a first step 201, a discrete value is determined based on one or more transmission parameters. The discrete value may for instance be determined from a memory, e.g. a database, comprising a look-up table, wherein the look-up table comprises one or more transmission parameters being associated with a discrete value. The memory may for instance be comprised by the server (e.g. server 110 of FIG. 1) or be connected to the server.

The one or more transmission parameters are for instance obtained (e.g. received) by a server (e.g. server 110 of FIG. 1), wherein the server may for instance acquire the one or more transmission parameters from a memory (e.g. a database). Alternatively, the one or more transmission parameters are for instance obtained (e.g. received) by the hub, e.g. from the server. The server may for instance be configured to monitor and/or manage one or more radio nodes (e.g. radio nodes 140 of FIG. 1) of the venue. With a radio node management system e.g. the radio node transmit power and additional parameters (e.g. transmission channel(s), and/or transmission interval) can be re-configured remotely or the advertisement message changed, when needed, corresponding to an example method according to the first and/or second and/or third exemplary aspect of the present invention.

In an optional second step 202, the determined discrete value is inserted into identifier information. The identifier information may for instance be used by an electronic device, which receives the identifier information, to identify, e.g. the radio node (e.g. one of the radio nodes 140), wherein the identifier information is sent by the radio node of the venue.

In an optional third step 203, the identifier information is outputted, e.g. by the server (e.g. server 110 of FIG. 1), in case the optional step 202 is performed prior to the step 203.

Figure 3:
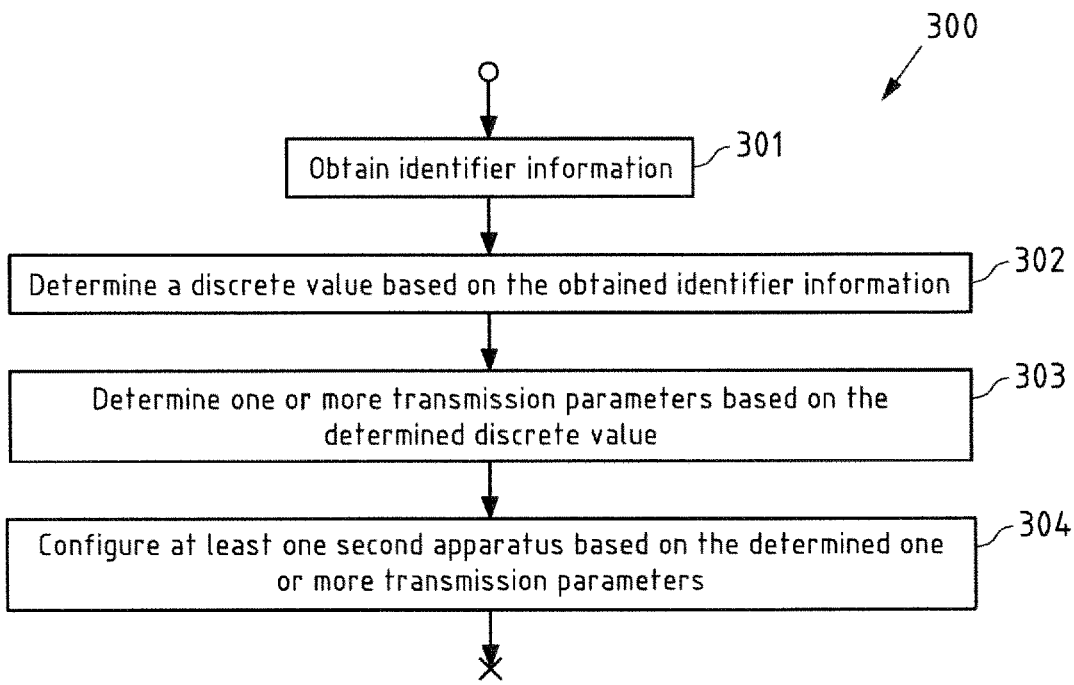
FIG. 3 a flowchart showing an example embodiment of a method according to the second exemplary aspect of the present invention, for instance performed by an electronic device 150 of FIG. 1.

FIG. 3 is a flowchart showing an example embodiment of a method according to the second exemplary aspect of the present invention. This flowchart 300 may for instance be performed by an electronic device (e.g. one or more of the electronic devices 150 of FIG. 1).

In a first step 301, identifier information is obtained (e.g. received), e.g. from a radio node (e.g. one of the radio nodes 140 of FIG. 1) by the electronic device (e.g. one or more of the electronic devices 150 of FIG. 1).

In a second step 302, a discrete value is determined based on the obtained identifier information. The obtained identifier information may for instance comprise the discrete value. The discrete value may for instance be determined by obtaining the discrete value from the identifier information.

In a third step 303, one or more transmission parameters are determined based on the determined discrete value. The one or more transmission parameters may for instance be determined from a memory, e.g. a database, comprising a look-up table, wherein the look-up table comprises one or more transmission parameters being associated with a discrete value. The memory may for instance be comprised by the server (e.g. server 110 of FIG. 1) or be connected to the server. Additionally or alternatively, the memory may for instance be comprised by or be connected to a hub (e.g. one of the hubs 130 of FIG. 1) having a communication connection to one or more radio nodes of the venue, which are to be provided with the determined one or more transmission parameters.

In a fourth step 304, at least one second apparatus (e.g. the electronic device 150 of FIG. 1, which has received the identifier information from a radio node 140 of FIG. 1) is configured based on the determined one or more transmission parameters.

Figure 4:
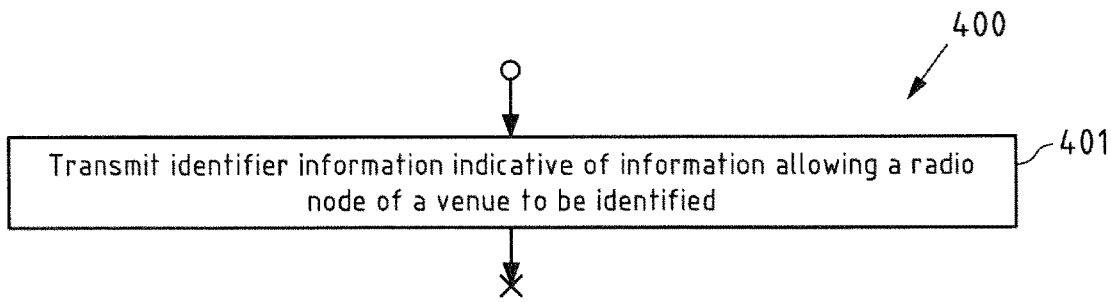
FIG. 4 a flowchart showing an example embodiment of a method according to the third exemplary aspect of the present invention, for instance performed a radio node 140 of FIG. 1.

FIG. 4 is a flowchart showing an example embodiment of a method according to the third exemplary aspect of the present invention. Flowchart 300 may for instance be performed a radio node (e.g. one or more of the radio nodes 140 of FIG. 1).

In a first step 401, identifier information indicative of information allowing a radio node of a venue to be identified are transmitted.

The identifier information comprises a discrete value inserted into the identifier information, wherein the discrete value is indicative of a value from a finite number of values. The discrete value is determined based on one or more transmission parameters, wherein each of the one or more transmission parameters is indicative of a respective attribute with respect to a communication of the radio node in the venue.

The identifier information is transmitted according to the one or more transmission parameters.

In an exemplary embodiment according to the third exemplary aspect, the discrete value is obtained (e.g. received; e.g. received from a server (e.g. server 110 of FIG. 1) prior to the transmitting of the identifier information. Prior to transmitting the identifier information, the obtained discrete value is inserted into the identifier information. The identifier information is then transmitted according to the one or more transmission parameters.

In a further exemplary embodiment according to the third exemplary aspect, the identifier information comprising the discrete value is obtained (e.g. received; e.g. received from a server (e.g. server 110 of FIG. 1) prior to the transmitting of the identifier information. The identifier information is then transmitted according to the one or more transmission parameters.

Figure 5:
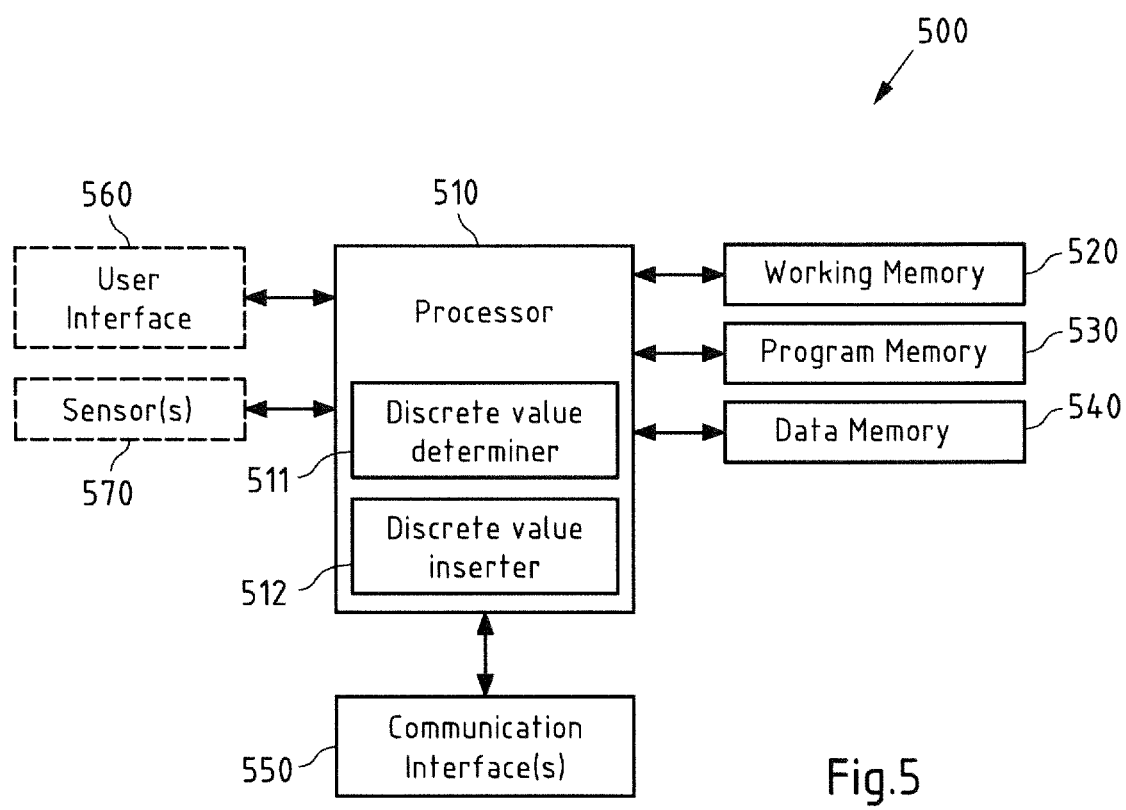
FIG. 5 a schematic block diagram of a first apparatus according to an exemplary aspect of the present invention.

FIG. 5 is a schematic block diagram of a first apparatus according to an exemplary aspect of the present invention, which may for instance represent a hub 130 or a server 110 of FIG. 1.

Apparatus 500 comprises a processor 510, working memory 520, program memory 530, data memory 540, communication interface(s) 550, an optional user interface 560 and an optional sensor(s) 570.

Apparatus 500 may for instance be configured to perform and/or control or comprise respective means (at least one of 510 to 570) for performing and/or controlling the method according to the first exemplary aspect. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the first exemplary aspect of the invention.

Processor 510 may for instance comprise a discrete value determiner 511 as a functional and/or structural unit. Discrete value determiner 511 may for instance be configured to determine a discrete value (see step 201 of FIG. 2). Processor 510 may for instance comprise a discrete value inserter 512 as a functional and/or structural unit. Discrete value inserter 512 may for instance be configured to insert a discrete value into identifier information (see optional step 202 of FIG. 2).

Processor 510 may for instance further control the memories 520 to 540, the communication interface(s) 550, the optional user interface 560 and the optional sensor(s) 570.

Processor 510 may for instance execute computer program code stored in program memory 530, which may for instance represent a computer readable storage medium comprising program code that, when executed by processor 510, causes the processor 510 to perform the method according to the first exemplary aspect.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 540 may for instance store one or more transmission parameters, one or more discrete values, and/or a look-up table comprising one or more transmission parameters and one or more discrete values, wherein the one or more transmission parameters may for instance be associated with a discrete value of the one or more discrete values.

Communication interface(s) 550 enable apparatus 500 to communicate with other entities, e.g. with one or more electronic devices 150 of FIG. 1, one or more hubs 130 of FIG. 1, gateway hub 120 of FIG. 1, and/or server 110 of FIG. 1. The communication interface(s) 550 may for instance comprise a wireless interface, e.g. a cellular radio communication interface and/or a WLAN interface) and/or wirebound interface, e.g. an IP-based interface, for instance to communicate with entities via the Internet.

User interface 560 is optional and may comprise a display for displaying information to a user and/or an input device (e.g. a keyboard, keypad, touchpad, mouse, etc.) for receiving information from a user.

Sensor(s) 570 are optional and may for instance comprise an accelerometer, a camera, or the like to name but a few non-limiting examples, e.g. to determine further information, which may for instance be used in a method according to the first exemplary aspect of the present invention.

Some or all of the components of the apparatus 500 may for instance be connected via a bus. Some or all of the components of the apparatus 500 may for instance be combined into one or more modules.

Figure 6:
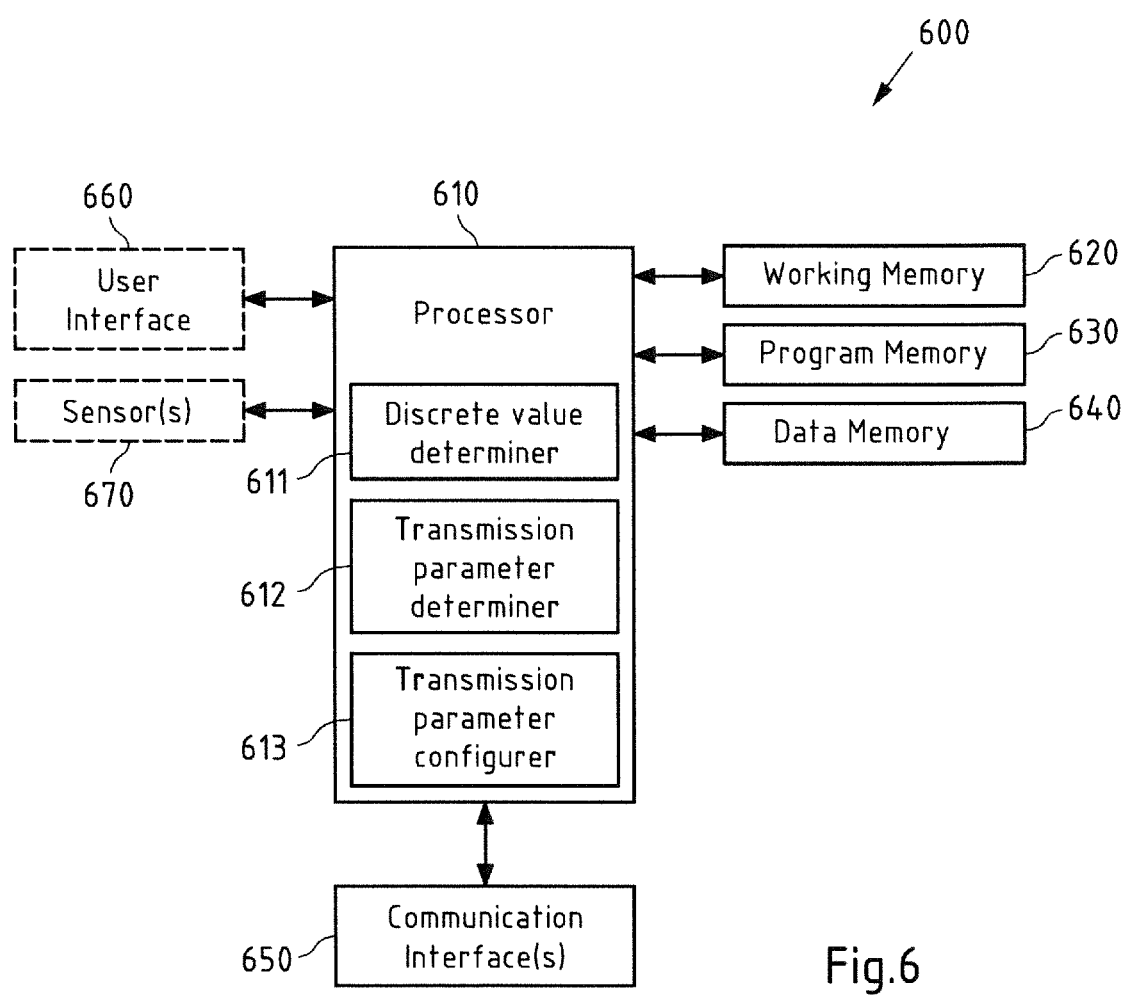
FIG. 6 a schematic block diagram of a second apparatus according to an exemplary aspect of the present invention.

FIG. 6 is a schematic block diagram of a second apparatus according to an exemplary aspect of the present invention, which may for instance represent an electronic device 150 of FIG. 1.

Apparatus 600 comprises a processor 610, working memory 620, program memory 630, data memory 640, communication interface(s) 650, an optional user interface 660 and an optional sensor(s) 670.

Apparatus 600 may for instance be configured to perform and/or control or comprise respective means (at least one of 610 to 670) for performing and/or controlling the method according to the second exemplary aspect. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to the second exemplary aspect of the invention.

Processor 610 may for instance comprise discrete value determiner 611 as a functional and/or structural unit. Discrete value determiner 611 may for instance be configured to determine a discrete value (see step 302 of FIG. 3). Processor 610 may for instance comprise transmission parameter determiner 612 as a functional and/or structural unit. Transmission parameter determiner 612 may for instance be configured to determine one or more transmission parameters (see step 303 of FIG. 3). Processor 610 may for instance comprise transmission parameter configurer 613 as a functional and/or structural unit. Transmission parameter configurer 613 may for instance be configured to configure a second apparatus (e.g. one of the electronic devices 150 of FIG. 1) based on determined one or more transmission parameters (see step 304 of FIG. 3).

Processor 610 may for instance further control the memories 620 to 640, the communication interface(s) 650, the optional user interface 660 and the optional sensor(s) 670.

Processor 610 may for instance execute computer program code stored in program memory 630, which may for instance represent a computer readable storage medium comprising program code that, when executed by processor 610, causes the processor 610 to perform the method according to the first exemplary aspect.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store one or more transmission parameters, one or more discrete values, and/or a look-up table comprising one or more transmission parameters and one or more discrete values, wherein the one or more transmission parameters may for instance be associated with a discrete value of the one or more discrete values.

Communication interface(s) 650 enable apparatus 600 to communicate with other entities, e.g. with at least one of the radio nodes 140 of FIG. 1. The communication interface(s) 650 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 600 to communicate with other entities, for instance with gateway hub 120, or server 110 of FIG. 1.

User interface 660 is optional and may comprise a display for displaying information to a user and/or an input device (e.g. a keyboard, keypad, touchpad, mouse, etc.) for receiving information from a user.

Sensor(s) 670 are optional and may for instance comprise a barometric sensor, e.g. to gather pressure information.

Some or all of the components of the apparatus 600 may for instance be connected via a bus. Some or all of the components of the apparatus 600 may for instance be combined into one or more modules.

Figure 7:
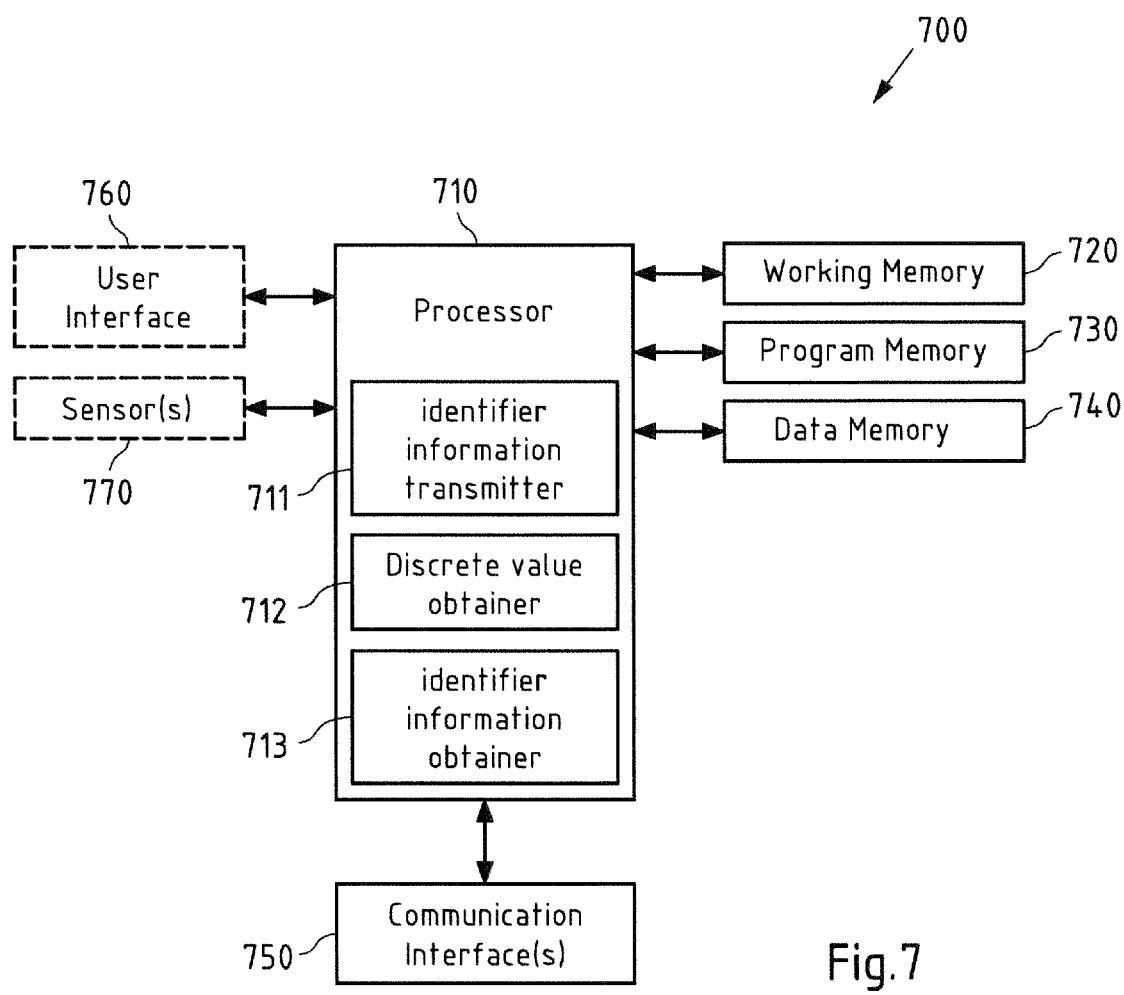
FIG. 7 a schematic block diagram of a third apparatus according to an exemplary aspect of the present invention.

FIG. 7 is a schematic block diagram of a third apparatus according to an exemplary aspect of the present invention, which may for instance represent a radio node 140 of FIG. 1.

Apparatus 700 comprises a processor 710, working memory 720, program memory 730, data memory 740, communication interface(s) 750, an optional user interface 760 and an optional sensor(s) 770.

Apparatus 700 may for instance be configured to perform and/or control or comprise respective means (at least one of 710 to 770) for performing and/or controlling the method according to the second exemplary aspect. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to the second exemplary aspect of the invention.

Processor 710 may for instance comprise an identifier information transmitter 711 as a functional and/or structural unit. Identifier information transmitter 711 may for instance be configured to transmit identifier information (see step 401 of FIG. 4). Processor 710 may for instance comprise a discrete value obtainer 712 as a functional and/or structural unit. Discrete value obtainer 712 may for instance be configured to obtain (e.g. receive) a discrete value. Processor 710 may for instance comprise an identifier information obtainer 713 as a functional and/or structural unit. Identifier information obtainer 713 may for instance be configured to obtain (e.g. receive) identifier information.

Processor 710 may for instance further control the memories 720 to 740, the communication interface(s) 750, the optional user interface 760 and the optional sensor(s) 770.

Processor 710 may for instance execute computer program code stored in program memory 730, which may for instance represent a computer readable storage medium comprising program code that, when executed by processor 710, causes the processor 710 to perform the method according to the first exemplary aspect.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 710 may for instance be an application processor that runs an operating system.

Program memory 730 may also be included into processor 710. This memory may for instance be fixedly connected to processor 710, or be at least partially removable from processor 710, for instance in the form of a memory card or stick. Program memory 730 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 730 may also comprise an operating system for processor 710. Program memory 730 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 740 may for instance store one or more transmission parameters, one or more discrete values, and/or a look-up table comprising one or more transmission parameters and one or more discrete values, wherein the one or more transmission parameters may for instance be associated with a discrete value of the one or more discrete values.

Communication interface(s) 750 enable apparatus 700 to communicate with other entities, e.g. with at least one of the radio nodes 140 of FIG. 1. The communication interface(s) 750 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 700 to communicate with other entities, for instance with gateway hub 120, or server 110 of FIG. 1.

User interface 760 is optional and may comprise a display for displaying information to a user and/or an input device (e.g. a keyboard, keypad, touchpad, mouse, etc.) for receiving information from a user.

Sensor(s) 770 are optional and may for instance comprise a barometric sensor, e.g. to gather pressure information.

Some or all of the components of the apparatus 700 may for instance be connected via a bus. Some or all of the components of the apparatus 700 may for instance be combined into one or more modules.

Figure 8:
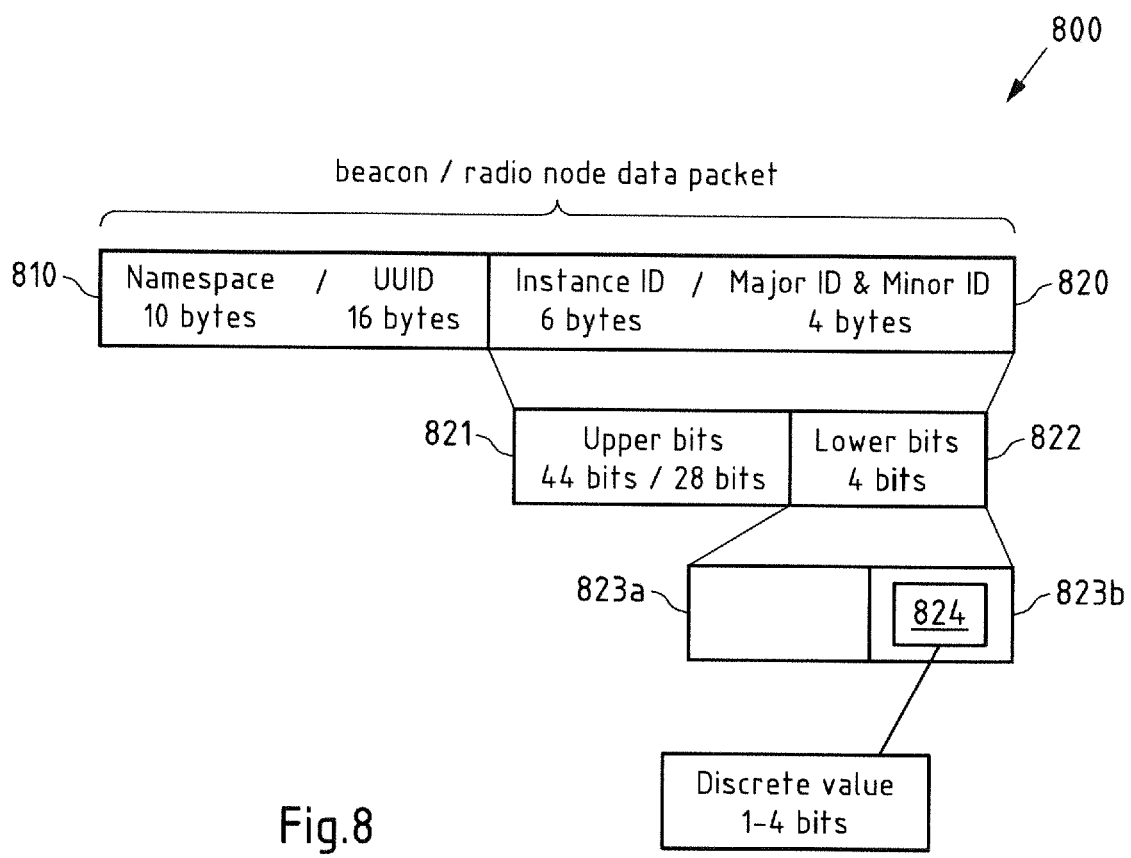
FIG. 8 a schematic visualization of identifier information as used in an example embodiment of a method according to the first and/or second and/or third exemplary aspect of the present invention.

FIG. 8 is a schematic visualization of identifier information as used in an example embodiment of a method according to the first and/or second and/or third exemplary aspect of the present invention.

The identifier information may for instance form a beacon respectively radio node data packet. For instance, the identifier information may for instance comprise a first part representing a ownership information 810, and a second part representing instance information 820.

The ownership information 810 may for instance also be referred to as 'namespace' or 'UUID' (Universally Unique Identifier). The instance information 820 may for instance also be referred to as 'instance ID' or 'major ID & minor ID'. For instance, in an example embodiment as used in the method according to the first and/or second and/or third exemplary aspect of the present invention, the ownership information 810 may for instance be formed by 10 bytes ('namespace'), or alternatively by 16 bytes ('UUID'). Further, in an example embodiment as used in the method according to the first and/or second and/or third exemplary aspect of the present invention, the instance information 820 may for instance be formed by 6 bytes ('instance ID'), or alternatively by 4 bytes ('major ID & minor ID').

The instance information 820 may for instance consist of a plurality of upper bits 821, and a plurality of lower bits 822. For instance, the plurality of upper bits 821 may be formed by 44 bits respectively 28 bits, and the plurality of lower bits 822 may for instance be formed by 4 bits.

As indicated by the arrow pointing from the discrete value 824 to the plurality of lower bits 822, which may for instance comprise a part 823*a* and another part 823*b*, the discrete value 824 is inserted into the plurality of lower bits 822. Depending upon the length of the discrete value (e.g. from 1 to 4 bits), the discrete value may for instance take place of the entire length of the plurality of lower bits 822, or not, wherein in the latter case the discrete value 824 may for instance be represented by the part 823*b* of the plurality of lower bits 822 and the part 823*a* may for instance comprise additional information.

Depending upon the length of the discrete value 824 (e.g. from 1 to 4 bits), the discrete value may for instance be a value of e.g. two possible values (in case the discrete value 824 has a length of 1 bit), or be a value of e.g. 16 possible values (in case the discrete value 824 has a length of 4 bits). It will be understood that the discrete value may have a length of more than 4 bits, as long as it can be inserted into the instance information 820 comprised by the identifier information.

The following embodiments shall also be considered to be disclosed:

It is advantageous, and indeed necessary, to change the Beacon ID, when changing the beacon Tx parameter set (Tx power, Tx channel and/or Tx interval), for certain use cases. Now, Beacon IDs can be arbitrary as such. In some use cases, known technique will work nicely, although the receiving device does not know the Tx power, Tx channel and/or Tx interval explicitly.

However, if the device needs to know one or two of the parameters, or indeed some other parameters, e.g. according to the Eddystone/iBeacon protocols do not support carrying such information. One such case is that for the increased (decreased) Tx interval the device might want to increase (decrease) the scanning rate to capture the beacon transmission more often (scanning takes energy so it's not advantageous to scan at high rate all the time).

Also, if the beacons are configured to use only a subset of TX channels (in minimum only one channel), the device needs to know which exact channels to scan to use the beacons for positioning.

Tx power is carried within the advertisement package, but Tx interval, Tx channel and other possible parameters not. Also, there is no mechanism to code information directly to the Beacon ID.

Introduce additional ad-hoc structure to the Beacon IDs so that the Tx parameters can be deduced directly from the Beacon ID. Such an arrangement considers:

Carry the mode of Tx parameters to the device in a backwards compatible way in the Beacon ID.

There three Tx parameters that can be changed:

Tx power—the beacon transmission power;

Tx interval—the beacon transmission interval; and

Tx channel—the channel(s) the beacon uses for broadcasting.

The following considers only the case of the Tx power & Tx interval. However, the scheme can trivially be extended to cover the Tx channel as well.

A particular combination of Tx power and Tx interval can be grouped as "power-interval mode" and given an identification. This identification can be used as a part of the Beacon ID so that when the device receives a given Beacon ID, the device can readily derive the power-interval mode the beacon uses. The following tables give examples, how the Tx parameters can be embedded in the Beacon ID.

Eddystone Protocol:

Eddystone UUID is 16 bytes long and consists of two parts:

i) Namespace, 10 bytes, Identifies e.g. the company or the owner of the beacon;

ii) Instance ID, 6 bytes, Identifies the beacon belonging to the namespace.

As an example, the TX parameters can be encoded as follows.

| Namespace | Upper 44 bits of the Instance ID | Lower 4 bits of the Instance ID (power-interval mode) |
|---|---|---|
| 0x FF EE DD CC BB AA 11 22 33 44 | 0x AA BB CC DD EE F | 0 - Tx power interval mode 1<br>1 - Tx power interval mode 2<br>2 - Tx power interval mode 3<br>3 - Tx power interval mode 4<br>...<br>E - Tx power interval mode 15<br>F - Tx power interval mode 16 |

W, the "Tx power-interval mdoe 1" can e.g. denote 0 dBm Tx power and 1 Hz interval. And "Tx power-interval mode 2" can e.g. denote 5 dBm Tx power and 2 Hz interval.

Similarly, for iBeacon, the Beacon ID structure is:
iBeacon Protocol:
i) UUID, 16 bytes, Identifies e.g. the company or the owner of the beacon;
ii) Major ID, 2 bytes, Identifies a group of beacons; can be e.g. a building or a floor;
iii) Minor ID, 2 bytes, Identifies the beacon in the group.

Again, the Tx parameter set can be coded into the lower bits of the Beacon ID:

| UUID | Major ID | Upper 12 bits of the Minor ID | Lower 4 bits of the Minor ID |
|---|---|---|---|
| 0x FF EE DD CC BB AA 11 22 33 44 55 66 77 88 99 00 | 0x AA BB | 0x CC D | 0 - Tx power interval mode 1<br>1 - Tx power interval mode 2<br>2 - Tx power interval mode 3<br>3 - Tx power interval mode 4<br>...<br>E - Tx power interval mode 15<br>F - Tx power interval mode 16 |

Note:
As the namespace/UUID is independent of the Instance ID/Minor ID used for carrying the mode information, the beacons utilizing the coding scheme can be identified based on the Namespace/UUID.

Note:
In case more modes are needed, then e.g. the whole lowest byte can be used for the mode indication. In such a case the number of possible modes is 256, which allows expressing e.g. all the combinations of six Tx powers, six Tx intervals and seven Tx channel variants (channel 37 or 38 or 39 or 37 & 38 or 37 & 39 or 38 & 39 or 37 & 38 & 39) leading to the total of 6 * 6 * 7 = 252 modes.

Note:
Although the Eddystone & iBeacon standards define the transmission of the Tx power in the Bluetooth advertisement package, it is advantageous to code it as presented in this specification as discrete set of pre-defined values. This is because the radio map needs to be generated per Tx parameter mode. Therefore, to keep the number of beacon radio maps low, the proposed approach is considered technically the best.

The Beacon ID can readily be used to carry the beacon transmission parameters in a backwards compatible way.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method, performed by at least one apparatus, comprising:
   determining a discrete value based on one or more transmission parameters, wherein each of the one or more transmission parameters is indicative of a respective attribute with respect to a communication of a radio node transmitting identifier information in a venue, wherein the discrete value is indicative of a value from a finite number of values, and wherein the identifier information is indicative of information allowing the radio node to be identified; and determining a representation of the discrete value, the representation corresponding to a number of bits, wherein the finite number of values is determined based at least in part on the number of bits, wherein at least a part of the identifier information comprises ownership information, wherein the ownership information is indicative of one or more radio nodes of a company or an owner of the one or more radio nodes of the venue.

2. The method according to claim 1, wherein the method further comprises:

inserting or causing insertion of the determined discrete value into the identifier information.

3. The method according to claim 1, wherein the one or more transmission parameters are associated with the discrete value so that based on the discrete value the one or more transmission parameters are determinable.

4. The method according to claim 1, wherein the one or more transmission parameters comprise one or more of the following parameters i) to iii):

i) a transmission power parameter;
ii) one or more transmission channel parameters; or
iii) a transmission interval parameter.

5. The method according to claim 1, wherein the discrete value is represented by one or more bits.

6. The method according to claim 1, wherein at least another part of the identifier information comprises instance information, wherein the instance information is indicative of an identification of the radio node of the venue, which is a part of the one or more radio nodes corresponding to the ownership information.

7. The method according to claim 6, wherein the instance information is divided into a plurality of upper bits and a plurality of lower bits, wherein the discrete value being represented by one or more bits is inserted into the plurality of lower bits.

8. A method, performed by at least one apparatus, comprising:

obtaining identifier information indicative of information allowing a radio node of a venue to be identified, wherein the identifier information comprises a representation of the discrete value, the representation corresponding to a number of bits;

determining a discrete value based on the obtained identifier information, wherein the discrete value is indicative of a value from a finite number of values and the finite number of values is determined based at least in part on the number of bits;

determining one or more transmission parameters based on the determined discrete value, wherein each of the one or more transmission parameters is indicative of a respective attribute with respect to a communication of the radio node transmitting the identifier information in the venue; and configuring the at least one apparatus based on the determined one or more transmission parameters, wherein at least a part of the identifier information comprises ownership information, wherein the ownership information is indicative of one or more radio nodes of a company or an owner of the one or more radio nodes of the venue.

9. The method according to claim 8, wherein the one or more transmission parameters are associated with the discrete value so that based on the discrete value the one or more transmission parameters are determinable.

10. The method according to claim 8, wherein one or more transmission parameters comprise one or more of the following parameters i) to iii):

i) a transmission power parameter;
ii) one or more transmission channel parameters; or
iii) a transmission interval parameter.

11. The method according to claim 8, wherein the discrete value is represented by one or more bits.

12. The method according to claim 8, wherein and at least another part of the identifier information comprises instance information, wherein the instance information is indicative of an identification of the radio node of the venue, which is a part of the one or more radio nodes corresponding to the ownership information.

13. The method according to claim 12, wherein the instance information is divided into a plurality of upper bits and a plurality lower bits, wherein the discrete value being represented by one or more bits is comprised by the plurality of lower bits.

14. An apparatus comprising at least one processor and at least one memory including computer program code, the at least one memory and the computer program code configured to, with the at least one processor, cause the apparatus to at least perform:

obtaining identifier information indicative of information allowing a radio node of a venue to be identified, wherein the identifier information comprises a representation of the discrete value, the representation corresponding to a number of bits;

determining a discrete value based on the obtained identifier information, wherein the discrete value is indicative of a value from a finite number of values and the finite number of values is determined based at least in part on the number of bits;

determining one or more transmission parameters based on the determined discrete value, wherein each of the one or more transmission parameters is indicative of a respective attribute with respect to a communication of the radio node transmitting the identifier information in the venue; and configuring the at least one second apparatus based on the determined one or more transmission parameters, wherein at least a part of the identifier information comprises ownership information, wherein the ownership information is indicative of one or more radio nodes of a company or an owner of the one or more radio nodes of the venue.

15. The apparatus according to claim 14, wherein the one or more transmission parameters are associated with the discrete value so that based on the discrete value the one or more transmission parameters are determinable.

16. The apparatus according to claim 14, wherein one or more transmission parameters comprise one or more of the following parameters i) to iii):

i) a transmission power parameter;
ii) one or more transmission channel parameters; or
iii) a transmission interval parameter.

17. The apparatus according to claim 14, wherein the discrete value is represented by one or more bits.

18. The apparatus according to claim 14, wherein at least another part of the identifier information comprises instance information, wherein the instance information is indicative of an identification of the radio node of the venue, which is a part of the one or more radio nodes corresponding to the ownership information.

19. The apparatus according to claim 18, wherein the instance information is divided into a plurality of upper bits and a plurality lower bits, wherein the discrete value being represented by one or more bits is comprised by the plurality of lower bits.

\* \* \* \* \*

UNITED STATES PATENT AND TRADEMARK OFFICE
CERTIFICATE OF CORRECTION

| | |
|---|---|
| PATENT NO. | : 11,388,572 B2 |
| APPLICATION NO. | : 16/647351 |
| DATED | : July 12, 2022 |
| INVENTOR(S) | : Lauri Aarne Johannes Wirola et al. |

Page 1 of 1

It is certified that error appears in the above-identified patent and that said Letters Patent is hereby corrected as shown below:

In the Claims

In Column 24, Line 17, Claim 13, delete "plurality lower" and insert -- plurality of lower --, therefor.

In Column 25, Line 1, Claim 19, delete "plurality lower" and insert -- plurality of lower --, therefor.

Signed and Sealed this
Eighteenth Day of July, 2023

Katherine Kelly Vidal
*Director of the United States Patent and Trademark Office*